United States Patent [19]
Ibbotson et al.

[11] 4,287,274
[45] Sep. 1, 1981

[54] COMPOSITE FLEXIBLE FILM LAMINATE

[75] Inventors: Peter Ibbotson, Wigan; John C. Smith, St. Helens; Colin Frodsham, Warrington, all of England

[73] Assignee: Pakcel Converters Limited, Merseyside, England

[21] Appl. No.: 79,061

[22] Filed: Sep. 26, 1979

[30] Foreign Application Priority Data
Oct. 3, 1978 [GB] United Kingdom ............. 39153/78

[51] Int. Cl.³ ............................................. H01L 31/00
[52] U.S. Cl. ................................ 429/156; 428/423.7; 428/425.5; 428/425.1; 428/425.8; 428/452; 428/458; 428/480; 428/343; 429/167
[58] Field of Search .................... 428/480, 458, 423.7, 428/425.5, 452, 425.1, 425.8, 343, 344, 347; 429/167, 156

[56] References Cited
U.S. PATENT DOCUMENTS

| | | | |
|---|---|---|---|
| 3,655,608 | 4/1972 | Guenther et al. | 428/425.1 |
| 3,666,593 | 5/1972 | Lee | 428/425.1 |
| 3,802,952 | 4/1974 | Gurin et al. | 425/425.1 |

Primary Examiner—Marion McCamish
Assistant Examiner—E. Rollins Buffalow
Attorney, Agent, or Firm—Emory L. Groff, Jr.

[57] ABSTRACT

A flexible film laminate, according to the invention, can be applied directly to the cardboard tubing of dry cell batteries during the manufacture of same.

In a preferred arrangement the laminate comprises, a first layer of a plastics film 1, a second layer of discrete areas of colored pigments 2, a third layer of adhesive 3, a fourth layer of a metallic deposit 4 on the surface of a fifth layer, said fifth layer of a plastics material 5, a sixth layer of adhesive 6, a layer of finely divided clay mineral particles 7, a layer of bleached kraft paper 8 and a final layer of uncured heat sensitive adhesive 9.

10 Claims, 1 Drawing Figure

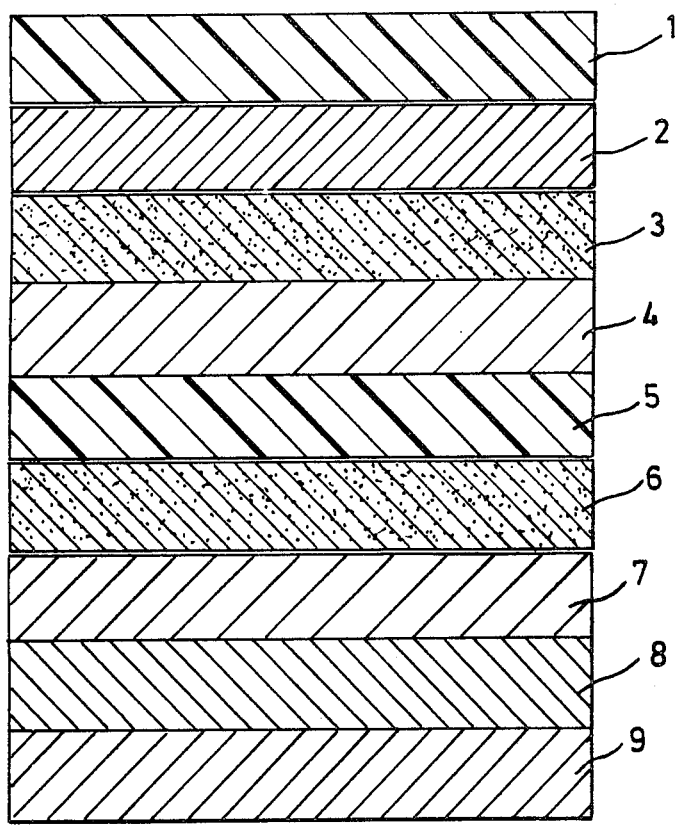

COMPOSITE FLEXIBLE FILM LAMINATE

BACKGROUND OF THE INVENTION

This invention relates to a composite flexible film laminate, intended for use in cylindrical lechlanche dry cell batteries, and to a dry cell or battery of dry cells incorporating such a laminate.

The dry cell comprises a cylindrical zinc can containing an electrolytic mix and central carbon electrode the can being enclosed within a spirally wound cardboard tube. Closure at the top and bottom of the cell is effected by metallic end plates, the upper plate having a central hole for positioning of the carbon electrode.

Sealing of the cardboard tube to the end plates is effected by mechanical crimping of the tube ends inside the lip of the end plates. The cell complete with the sealed cardboard tube surround is then inserted into a ready made printed tin plate case, the cell being finished by crimping of the tin plate outer by the same method as for the cardboard tube.

OBJECT OF THE INVENTION

It is an object of the invention to provide a flexible film laminate to replace the outer tin plate casing, which film can be applied directly to the cardboard tubing of dry cell batteries.

SUMMARY OF THE INVENTION

According to this invention there is provided a laminate film comprising a layer of a plastic material, a layer of adhesive, a layer of paper having a clay based coating and a further layer of uncured adhesive.

The plastic material may be a polyethylene teraphthalate film. The adhesive may be a two component polyurethane curing system, one component being an hydroxyl terminated material and the second component being an isocyanate terminated material. Preferably the clay based coating comprises a finely divided dispersion of clay minerals which is applied to the surface of the paper, then dried and smoothed. Preferred paper includes bleached kraft paper. A suitable uncured adhesive is a heat sensitive type which may be based principally on ethylene vinyl acetate. Such a laminate film serves to provide a battery casing structure.

According to a preferred arrangement the laminate film comprises a first layer of a plastic material, a second layer of discrete areas of coloured pigments, a third layer of adhesive, a fourth layer of a metallic deposit on the surface of a fifth layer, said fifth layer being of a plastics material, a sixth layer of adhesive, a seventh layer of a clay based coating on an eighth layer, said eighth layer being paper and a ninth layer of uncured adhesive.

Preferably the first and fifth layers of plastic material are polyethylene terephthalate film which may further be bi-axially oriented. The second layer may comprise a printing ink system based on polyester resin with coloured pigments dispersed therein, which ink may be rendered into a graphical design by rotgravure or flexographic methods.

The third and sixth layers of adhesive may be a two component polyurethane adhesive, one component being hydroxyl terminated, the second component being isocyanate terminated. The fourth layer is preferably an aluminium despoit on the surface of the fifth layer. The clay based coating may be a finely divided dispersion of clay minerals which is applied to the surface of the paper then dried and smoothed. Preferred paper includes bleached kraft paper. A suitable uncured adhesive is a heat sensitive type which may be based principally on ethylene vinyl acetate.

The laminate structure is capable of presenting a metallic visual effect and carrying graphical designs. It is capable of withstanding battery manufacture conditions, specifically the mechanical stress imposed during the crimping operation providing the closure seal with the top and bottom plates. The laminate is further capable of application to a spirally wound cardboard tube by simple means and is resistant to chemical attack caused through possible leakage of the battery. In order to ensure conformity to international dry cell battery dimensions, the thickness of the laminate structure is comparable to that of the tin plate casing.

BRIEF DESCRIPTION OF THE DRAWING

The drawing shows a sectional view through a laminate structure according to the invention.

DETAILED DESCRIPTION OF PREFERRED EMBODIMENT

In the drawing, a first layer 1 is of biaxially oriented polyethylene terephthalate film which provides resistance to the mechanical stress incurred during the crimping operation. A second layer 2 consists of a printing ink graphical design on the first layer and visible therethrough. The printing ink is a coloured pigment dispersion within a polyester resin base and is resistant to cracking, being able to withstand the mechanical stress encountered in crimping. The first layer 1 also provides visual gloss and physical protection to layer 2 of the graphical design.

The third layer 3 is a two component isocyanate-hydroxyl polyurethane curing adhesive providing interlayer adhesion between layers 1 and 2 to 4, and resistance to mechanical stress. Layer 4 is a metallic aluminium deposit on the surface of layer 5, which latter is identical to layer 1. Layers 4 and 5 provide in effect a one side metallised flexible film. Layer 4 provides a visual metallic effect when viewed through layers 1, 2 and 3. The fifth layer 5 forms the carrier web for layer 4 and further provides stress resistance in the crimping operation.

Layer 6 comprises a two component isocyanate-hydroxyl polyurethane curing adhesive identical to layer 3 and provides adhesion between layers 5 and 7. The seventh layer 7 is a finely divided dispersion of clay minerals, additives and binders on layer 8. After application of bleached kraft paper layer 8 the clay coating is dried and smoothed. This clay base provides a compact surface of extremely high smoothness which ensures minimum distortion of layer 2 and hence minimum distortion of visual effect.

The clay based paper 8 forms the carrier web for a final layer of adhesive 9, which is heat sensitive and based upon ethylene vinyl acetate as the major component.

This ninth layer provides an adhesive system wherein the composite laminate film can be adhered to the surface of a spirally wound cardboard tube by application of heat. When all nine layers are secured together, a battery casing laminate structure is formed with a metallic visual effect and suitable graphic design visible through the transparent layers.

In embodiments of the invention, layers 2, 4, 5 and 6 are omitted or alternatively only layers 2, 4 are omitted from the structure.

We claim:

1. A laminate film comprising a first layer of a plastics material, a second layer of discrete areas of coloured pigments, a third layer of adhesive, a fourth layer of a metallic deposit on the surface of a fifth layer, said fifth layer being of a plastics material, a sixth layer of adhesive, a seventh layer of a clay based coating on an eighth layer, said eighth layer being paper and a ninth layer of uncured adhesive.

2. A laminate film according to claim 1 wherein the first and fifth layers of plastic material are polyethylene terephthalate film.

3. A laminate film according to claim 1 wherein the second layer is a printing ink system comprising a polyester resin base with coloured pigments dispersed therein.

4. A laminate film according to claim 1 wherein the coloured pigments are rendered into a graphical design.

5. A laminate film according to claim 1 wherein the third and sixth layers are both hydroxyl-isocyanate polyurethane curing adhesives.

6. A laminate film according to claim 1 wherein the metallic deposit is of aluminium.

7. A laminate film according to claim 1 wherein the clay based coating is a finely divided dispersion of clay minerals which is applied to the surface of the paper then dried and smoothed.

8. A laminate film according to claim 1 wherein the paper is bleached kraft paper.

9. A laminate film according to claim 1 wherein the uncured adhesive is heat sensitive and contains ethylene vinyl acetate.

10. A dry cell or battery of dry cells incorporating as the casing thereof a laminate film according to claim 1.

* * * * *